US009210129B2

(12) United States Patent
McKinney

(10) Patent No.: US 9,210,129 B2
(45) Date of Patent: Dec. 8, 2015

(54) SYSTEMS AND METHODS FOR PROVIDING A MULTIPLE SECURE LINK ARCHITECTURE

(71) Applicant: Acceleration Systems, LLC, Lexington, KY (US)

(72) Inventor: Jack D. McKinney, Lexington, KY (US)

(73) Assignee: Acceleration Systems, LLC, Lexington, KY (US)

( * ) Notice: Subject to any disclaimer, the term of this patent is extended or adjusted under 35 U.S.C. 154(b) by 0 days.

(21) Appl. No.: 14/174,452

(22) Filed: Feb. 6, 2014

(65) Prior Publication Data

US 2014/0157398 A1 Jun. 5, 2014

Related U.S. Application Data

(63) Continuation of application No. PCT/US2014/015035, filed on Feb. 6, 2012.

(51) Int. Cl.
*G06F 21/00* (2013.01)
*H04L 29/06* (2006.01)
*H04L 29/12* (2006.01)

(52) U.S. Cl.
CPC ........ *H04L 63/0272* (2013.01); *H04L 61/2525* (2013.01); *H04L 61/2592* (2013.01); *H04L 61/2092* (2013.01); *H04L 61/2514* (2013.01)

(58) Field of Classification Search
CPC .................................................. H04L 63/0272
See application file for complete search history.

(56) References Cited

U.S. PATENT DOCUMENTS

| | | | |
|---|---|---|---|
| 6,421,730 B1 * | 7/2002 | Narad et al. | 709/236 |
| 7,149,808 B2 | 12/2006 | Lu | |
| 7,450,585 B2 | 11/2008 | Dispensa | |
| 7,582,861 B2 | 9/2009 | Mukaibatake | |
| 7,734,819 B1 | 6/2010 | Somasundaram et al. | |
| 7,743,155 B2 | 6/2010 | Pisharody et al. | |
| 7,764,691 B2 | 7/2010 | Sehgal et al. | |
| 7,814,541 B1 | 10/2010 | Manvi | |
| 7,840,701 B2 * | 11/2010 | Hsu et al. | 709/238 |
| 7,894,364 B2 * | 2/2011 | Baron et al. | 370/252 |
| 8,170,014 B1 | 5/2012 | Metz et al. | |
| 8,249,081 B2 | 8/2012 | Chang et al. | |
| 8,281,387 B2 | 10/2012 | Gupta et al. | |
| 2002/0042832 A1 | 4/2002 | Fallentine et al. | |
| 2005/0144282 A1 * | 6/2005 | Argo | 709/226 |
| 2006/0225130 A1 | 10/2006 | Chen et al. | |
| 2007/0180088 A1 | 8/2007 | Zhao | |
| 2007/0180142 A1 * | 8/2007 | Small et al. | 709/245 |
| 2008/0034420 A1 | 2/2008 | Chang | |
| 2008/0201486 A1 * | 8/2008 | Hsu et al. | 709/238 |

(Continued)

OTHER PUBLICATIONS

International Search Report, PCT/US2014/010023, dated Apr. 16, 2014, 16 pages.

*Primary Examiner* — Morshed Mehedi
(74) *Attorney, Agent, or Firm* — Dinsmore & Shohl LLP

(57) ABSTRACT

Some embodiments disclosed herein include a MSL twin network address translator (NAT) that includes logic that, when executed by a processor, causes the MSL twin NAT to receive inbound datagram from MSL VPN and record a new VPN owner private IP address from a source IP address in the inbound datagram. In some embodiments the logic causes the MSL twin NAT to assign a new UPIP for the inbound datagram and client workstation and facilitate sending the inbound datagram to the client workstation.

19 Claims, 10 Drawing Sheets

(56) References Cited

U.S. PATENT DOCUMENTS

| | | |
|---|---|---|
| 2010/0046526 A1 | 2/2010 | Kompella |
| 2011/0252146 A1 | 10/2011 | Sanamaria et al. |
| 2012/0005476 A1* | 1/2012 | Wei et al. ................ 713/153 |
| 2012/0179831 A1 | 7/2012 | Brousseau et al. |
| 2012/0317252 A1 | 12/2012 | Vemulapalli |
| 2014/0215050 A1 | 7/2014 | Lu |

* cited by examiner

SYSTEMS AND METHODS FOR PROVIDING A MULTIPLE SECURE LINK ARCHITECTURE

CROSS REFERENCE

This application is a continuation of PCT application number PCT/US14/15035 filed Feb. 6, 2014, and entitled Systems and Methods for Providing a Multiple Secure Link Architecture, which is hereby incorporated by reference in its entirety.

BACKGROUND

The Internet currently supports worldwide communication among computers using various standard protocols. One of these protocols, the Internet Protocol (IP), assigns a unique address to each computer known as the IP address. IP is currently available in two versions: IPv4 with 32 bit addresses, and IPv6 with 128 bit addresses. IPv4 is the most common version in use today.

Growth of the Internet has used all of the available 32 bit addresses in IPv4. One result of the limited number of addresses is that most organizations now use one of the three private address spaces defined by IPv4. These private IP addresses cannot be used on the public Internet. Gateway routers manage the interface between the private intranet and the public Internet. Gateway routers provide various functions to hide or mask the private internal IP when communication outside the private network is desired.

One common method used by gateway routers in commercial environments is the creation of a Virtual Private Network (VPN) to connect external users to the internal private network. A VPN provides an envelope or wrapper protocol to hide the internal IP addresses and data while the packet is routed across the public Internet to the client workstation.

The VPN extends the internal private network by assigning an internal private IP address to the client workstation as the client workstation connects to the VPN gateway. The VPN creates a network or VPN tunnel that connects the applications on the client workstation to the internal private network behind the VPN gateway (or owner gateway). The client workstation's local private network and the public Internet are hidden from applications on the client workstation by the VPN tunnel. As a result, in current versions of VPN, the client workstation can only connect to one VPN at a time. If a client workstation were able to connect to more than one VPN then, since the internal private address realms for each VPN are not guaranteed to be unique, packets could not be reliably routed to the desired destinations.

SUMMARY

Embodiments disclosed herein include a system for providing a multiple secure link (MSL) architecture. Some embodiments of the system include a MSL virtual private network (VPN) component that includes first logic that, when executed by a processor, causes the system to create a VPN tunnel between a client workstation and an owner gateway, send an outbound datagram from the client workstation to the owner gateway, and receive a inbound datagram from the owner gateway to the client workstation, where the inbound datagram includes a source IP address and a destination internet protocol (IP) address that is set to a VPN owner private IP address. In some embodiments, the first logic causes the system to send the inbound datagram with the destination IP address. Embodiments of the system may also include a MSL twin network address translator (NAT) that includes second logic that, when executed by the processor, causes the system to receive the inbound datagram from MSL VPN, record a new VPN owner private IP address from the source IP address in the inbound datagram, assign a new UPIP address for the inbound datagram and the client workstation, and facilitate sending the inbound datagram to the client workstation.

Similarly, some embodiments disclosed herein include a MSL virtual private network (VPN) component that includes logic that, when executed by a processor, causes the MSL VPN to create a VPN tunnel between a client workstation and an owner gateway and send an outbound datagram from the client workstation to the owner gateway. In some embodiments, the logic causes the MSL VPN component to receive a inbound datagram from the owner gateway to the client workstation, where the inbound datagram includes a source IP address and a destination internet protocol (IP) address that is set to a VPN owner private IP address and send the inbound datagram with the destination IP address.

Still some embodiments disclosed herein include a MSL twin network address translator (NAT) that includes logic that, when executed by a processor, causes the MSL twin NAT to receive inbound datagram from MSL VPN and record a new VPN owner private IP address from a source IP address in the inbound datagram. In some embodiments the logic causes the MSL twin NAT to assign a new UPIP address for the inbound datagram and client workstation and facilitate sending the inbound datagram to the client workstation.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Embodiments disclosed herein include a system and/or method for providing a multiple secure link architecture. Specifically, each VPN owner defines a network realm with VPN owner defined private IPv4 addressing. VPN owner network realms are expected to have addresses that overlap since all VPN owners could use 10.0.0.0/24 as their network definition. Embodiments disclosed herein define an internal network realm to use while packets are within the MSL service. MSL provides twin NAT functions to translate all VPN owner-defined private IP addresses to and from MSL unique private IP (UPIP) realm addresses as packets enter or leave the MSL service. VPN owner servers are dynamically assigned an MSL UPIP realm address as they are discovered in processed packets.

When the client workstation opens the first VPN connection, either the VPN owner private IP assigned to the client workstation or the UPIP address for the client workstation can be used as the IP address for the client workstation. As a second (or later) VPN is opened, the IP address previously used for the workstation IP may be used as the UPIP for the workstation and new UPIP are assigned to servers from the second VPN. Client workstation applications communicate with MSL UPIP. MSL source and destination NAT converts between UPIP and VPN owner private IP so that the servers see only VPN owner private IP addresses. This allows the client workstation to simultaneously facilitate a plurality of independent VPN connections with different owner gateways and/or VPNs.

In an IPv6 environment, the VPN owner network addresses are generated as 128 bit UPIP and are used in IPv6 as described in the paragraph above for IPv4. Since Unique Local IPv6 Unicast Addresses have a very high probability of being unique, MSL can generate an IPv6 UPIP for the workstation and use the private IPv6 addresses for the nodes behind the VPN owner gateway. MSL must verify that each new IPv6 VPN has not duplicated the Unique Local IPv6 Unicast Addresses of an already open VPN. If a duplicate is found, UPIP will be generated for the nodes in that VPN, as described in the paragraph above for IPv4. The Local IPv6 addresses are created using a pseudo-randomly allocated global ID. One embodiment may have the following format of Table 1.

TABLE 1

| 7 bits | 1 | 40 bits | 16 bits | 64 bits |
|---|---|---|---|---|
| Prefix | L | Global ID | Subnet ID | Interface ID |
| 1111110 | 1 | pseudo-random | | |

Figure 1:
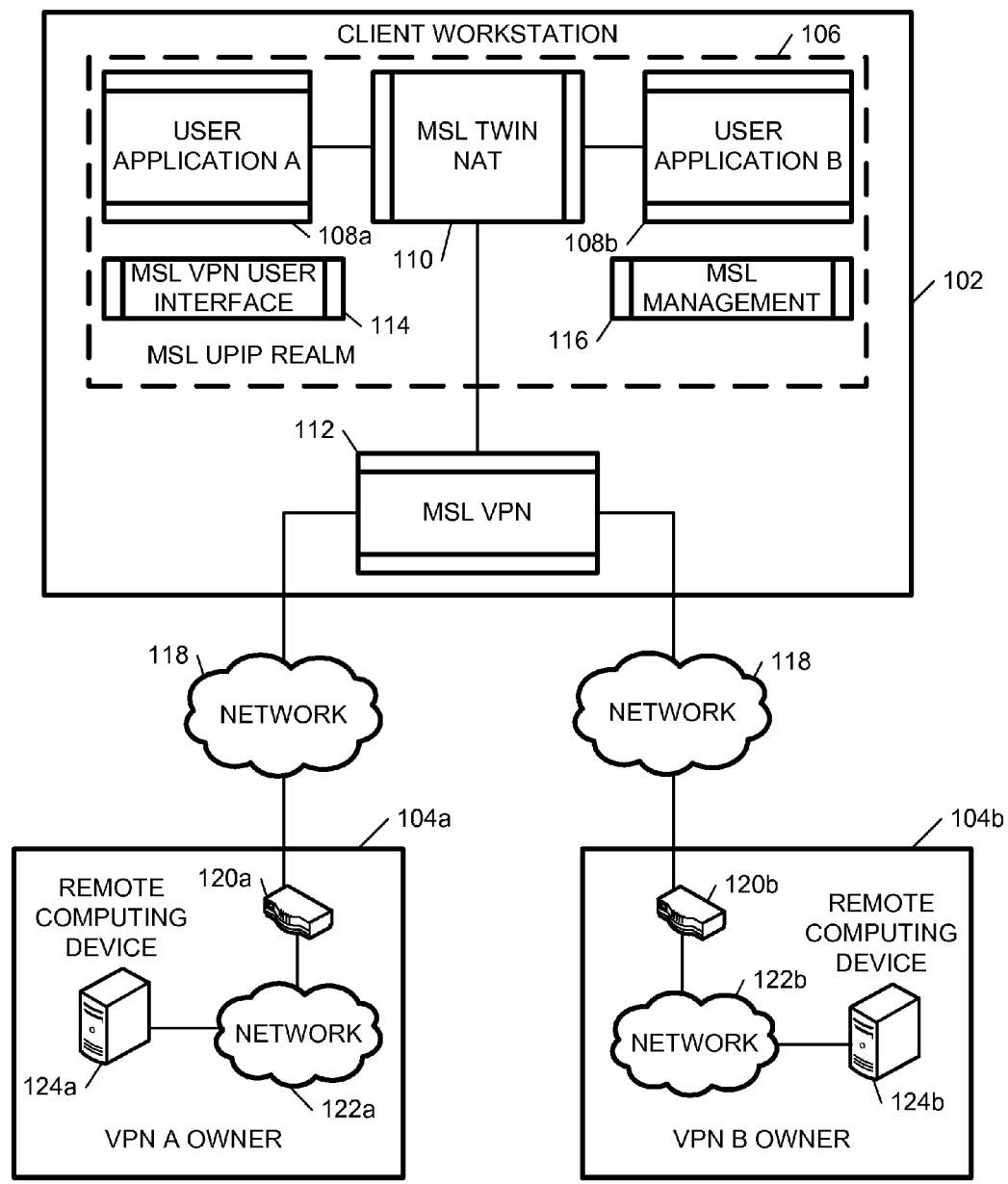
FIG. 1 depicts a computing environment for providing a multiple secure link architecture on a client workstation, according to embodiments disclosed herein.

Referring now to the drawings, FIG. 1 depicts a computing environment for providing a multiple secure link architecture on a client workstation 102, according to embodiments disclosed herein. As illustrated, MSL architecture creates a private IP realm or address space (MSL Unique Private IP Realm) that is isolated from both the public Internet IP addresses and the private IP addresses of VPN owners.

As illustrated, the architecture of FIG. 1 includes a client workstation 102, a first VPN (VPN A 104a), and a second VPN (VPN B 104b). The client workstation 102 may include a user application A 108a and a user application B 108b. The user applications 108a, 108b may be utilized to communicate with the VPN A 104a and the VPN B 104b. Also included in the client workstation 102 are an MSL twin NAT component 110, a MSL VPN user interface component 114, and a MSL management component 116, which make up the MSL UPIP realm 106. A MSL VPN component 112 is also included in the client workstation 102. This configuration may allow for VPN communications with the VPN A 104a and/or the VPN B 104b via a wide area or public network 118. The public network 118 may include the internet and/or other publicly accessible network.

Accordingly, the client workstation 102 may include a plurality of components, which may or may not be included in a MSL standalone client software. As an example, the components of the MSL standalone client software may include the MSL management component 116, which may operate as a session manager to maintain session information for the client workstation 102. The session manager may be configured to assign UPIP and provide UPIP coordination information to MSL Twin NAT component 110. Similarly, the components may also include the MSL User Interface component 114, which provides one or more user interfaces so that the user can identify a VPN connection, delete a VPN Connection, open a VPN connection, or shut down an open VPN connection. The MSL VPN component 112 may be utilized to provide the source IP on the external packets from the owner gateway 120a, 120b to identify the owner gateway 120a, 120b and/or the VPN 104a, 104b. Packets from MSL Twin NAT component 110 may include the destination public IP to identify the destination Gateway/VPN. The MSL Twin NAT component 110 is also included and translates both source and destination IP addresses in the clear text packets to and/or from assigned UPIP addresses. For an inbound datagram (including response datagrams), the MSL Twin NAT component 110 uses the source IP provided by MSL VPN component 112 to identify the owner gateway 120a, 120b. For outbound datagrams, the MSL Twin NAT component 110 uses the source and destination UPIP to identify the destination public IP for the owner gateway 120a, 120b, and/or VPN 104a, 104b.

Accordingly, with the components in the client workstation 102, a secure communication may be made with one or more computing devices on the VPN A 104a and the VPN B 104b. The VPN A 104a may include an owner gateway 120a, which is coupled to one or more computing devices (such as the remote computing device 124a) via a local network 122a. Similarly, the VPN B 104b may also include an owner gateway 120b, which facilitates communication with one or more remote computing devices, such as the remote computing device 124b via a local network 122b.

Multiple Secure Link Architecture assigns a unique private IP address (UPIP) for each host, such as a remote computing device 124a, 124b, server, etc. that communicates with a client workstation 102 using MSL technology, so that all user organization hosts (systems) have unique IP addresses within the MSL Private IP realm 106. MSL architecture provides a twin NAT function to manage the MSL private IP realm 106. MSL twin NAT 110 translates between VPN owner assigned private IP addresses and assigned UPIP so that the workstation has unique IP addresses for all VPN owner hosts even when multiple VPN owners have the same private IP addresses.

The accordingly, the user application A 108*a* and the user application B 108*b* see UPIP while the VPN owner hosts see only the VPN owner's internal private IP addresses. The MSL twin NAT 110 is coordinated to translate between VPN owner assigned private IP addresses and MSL architecture assigned UPIP so that the user application A 108*a* and the user application B 108*b* see UPIP and VPN owner's hosts see only the VPN owner's internal private IP addresses.

The client workstation 102 connects to VPN A 104*a* using MSL user interface and management functions. The MSL management component 116 assigns UPIP to VPN A 104*a* nodes, including the remote computing device 124*a*. The client workstation 102 can now access VPN A 104*a* in the usual manner.

The client workstation 102 may additionally connect to VPN B 104*b* using MSL user interface component 114 and MSL management component 116. The MSL management component 116 assigns UPIP to nodes on the VPN B 104*b*, such as the remote computing device 124*b*. Since the VPN A 104*a* has already assigned a UPIP to the client workstation 102, the MSL management component 116 uses the same UPIP value for VPN B 104*b* IP. The client workstation 102 can now access computing devices such as the remote computing device 124*b* on VPN B 104*b* with the user applications 108*a*, 108*b* in the usual manner.

Table 2, below, shows an example of the IP address assignments. It should be noted that the IP may have been selected to simplify tracking of assignments.

TABLE 2

|  | VPN owner Private IP | MSL UPIP |
|---|---|---|
| VPN A Server | 10.0.0.10 | 192.168.0.10 |
| VPN A Workstation | 10.0.1.1 | 192.168.1.1 |
| VPN B Server | 10.0.2.20 | 192.168.2.20 |
| VPN B Workstation | 10.0.3.30 | 192.168.1.1 |

The client workstation 102 is assigned the UPIP generated when the client workstation 102 logs on to VPN A 104*a*. When the client workstation 102 logs onto VPN B 104*b*, the computing devices behind VPN B 104*b* are assigned UPIP but the client workstation 102 continues to use the workstation UPIP generated for VPN A 104*a*. It should be understood that the user applications 108*a*, 108*b* now operate in the MSL UPIP realm 106.

Figure 2:
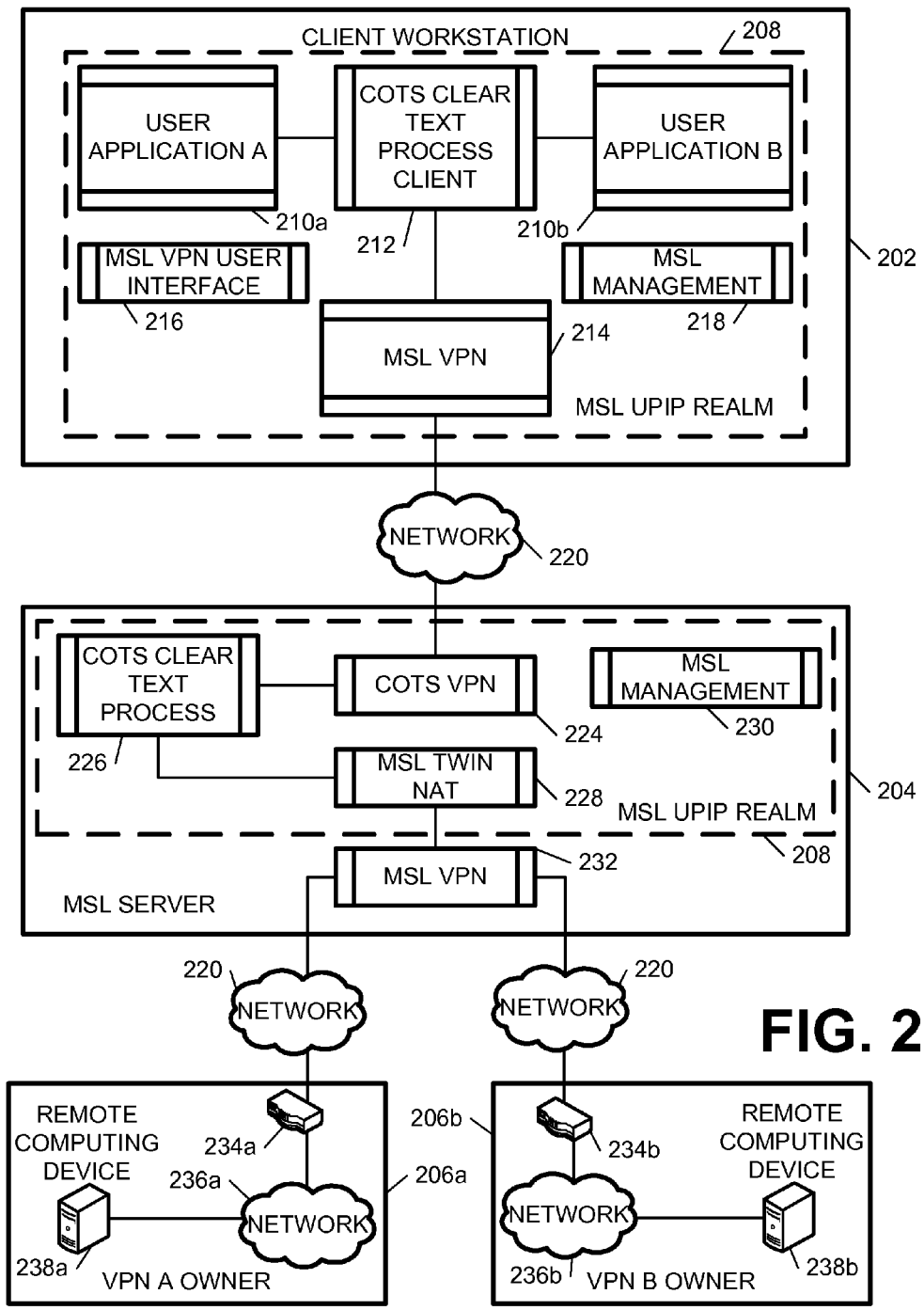
FIG. 2 depicts a computing environment for providing a multiple secure link architecture on a MSL server, according to embodiments disclosed herein.

FIG. 2 depicts a computing environment for providing a multiple secure link architecture on a MSL server 204, according to embodiments disclosed herein. As illustrated, the embodiment of FIG. 2 includes a client workstation 202, a MSL server 204, VPN A 206*a*, and VPN B 206*b*. The client workstation 202 may include a user application A 210*a*, a user application B 210*b*, a commercial off the shelf (COTS) clear text process client 212, a first MSL VPN component 214, a MSL VPN user interface component 216, and a first MSL management component 218. These components may comprise an MSL UPIP realm 208 and may be configured to establish VPN communications with the VPN A 206*a* and/or the VPN B 206*b* via a public network 220, such as the internet.

To facilitate this communication, the MSL server 204 may include a COTS VPN component 224, a COTS clear text process component 226, a MSL twin NAT component 228, and a second MSL management component 230, which are also part of the MSL UPIP realm 208. A second MSL VPN component 232 may also be included. Accordingly, these components may also be remote from the VPN A 206*a* and/or VPN B 206*b* and may send one or more datagrams to an owner gateway 234*a*, 234*b*, which is coupled to a local network 122*a*, 122*b* for sending and/or receiving data from remote computing devices 238*a*, 238*b* and/or other computing devices on the VPN A 206*a*, and/or VPN B 206*b*.

Accordingly, the embodiment of FIG. 2 may operate similar to that described with regard to FIG. 1, except that the embodiment of FIG. 2 utilizes an MSL server 204 that is remote from the client workstation 202. Accordingly, this configuration extends the MSL UPIP realm 208 to the MSL server 204, which can host COTS clear text functions such as acceleration so that the COTS clear text function can be applied to each VPN used by a plurality of different client workstations. Additionally, the COTS VPN component 224 is provided connecting the MSL Server 204 and the client workstation 202 to protect data as it moves between the client workstation 202 and the MSL server 2044 over the public network 220.

Figure 3:
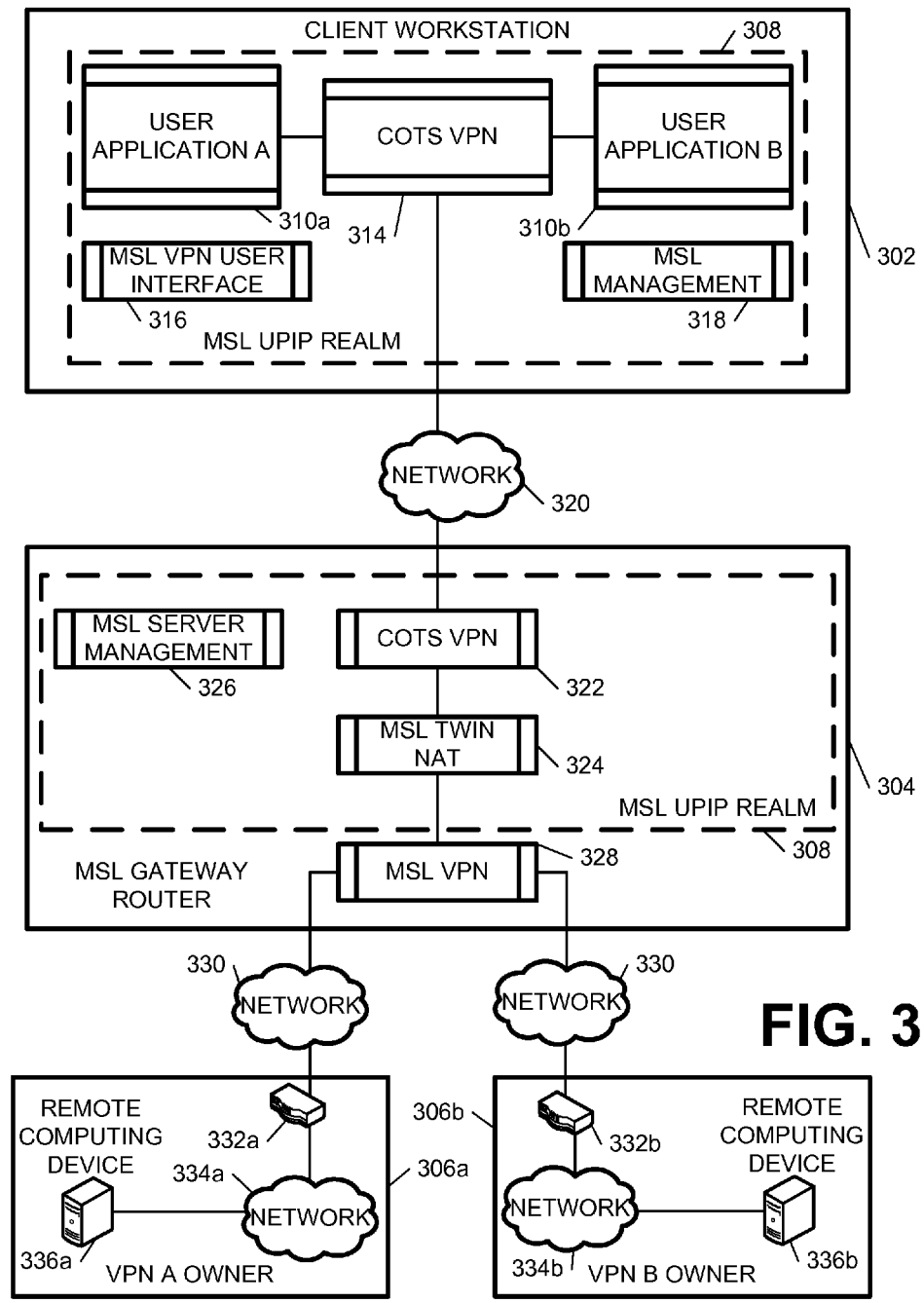
FIG. 3 depicts a computing environment for providing a multiple secure link architecture on a MSL gateway router, according to embodiments disclosed herein.

FIG. 3 depicts a computing environment for providing a multiple secure link architecture on a MSL gateway router 304, according to embodiments disclosed herein. As illustrated, the embodiment of FIG. 3 includes a client workstation 302, a MSL gateway router 304, a VPN A 306*a*, and a VPN B 306*b*. The client workstation 302 includes a user application A 310*a*, a user application B 310*b*, a first COTS VPN component 314, a MSL VPN user interface component 316, and a MSL management component 318, which comprise a portion of the MSL UPIP realm 308.

Accordingly, the client workstation 302 may communicate with a MSL gateway router 304 via a local and/or private network 320. The MSL gateway router 304 may include a second COTS VPN component 322, a MSL twin NAT component 324, and a MSL server management component 326, which are also part of the MSL UPIP realm 308. A MSL VPN 328 is also included with the MSL gateway router 304 and may facilitate communication with the VPN A 306*a* and/or VPN B 306*b* via a public network 330.

As discussed above with regard to other VPNs, the VPN A 306*a* includes an owner gateway 332*a* that is coupled to a private network 334*a*. The private network 334*a* may be coupled to one or more computing devices, such as the remote computing device 336*a*. Similarly, VPN B 306*b* includes an owner gateway 332*a* that is coupled to a private network 334*b*. The private network 334*b* may be coupled to one or more computing devices, such as the remote computing device 336*b*.

Accordingly, the embodiment of FIG. 3 extends the MSL UPIP realm 308 to a MSL gateway router 304 that supports a plurality of client workstations. Such a configuration may be economical where a single component may be utilized for a plurality of client workstations (such as at a school network, business network, etc.). Additionally, the COTS VPN component 332 is coupled the client workstation 302 to protect data as it moves between the workstation and the MSL router over the private network 320.

It should also be understood that while the user applications 310 may be a plurality of separate applications that operate completely independently, this is just one embodiment. Specifically, some embodiments are configured such that a common browser application may serve both application A 310*a* and application B 310*b* by displaying different tabs or pages.

Figure 4:
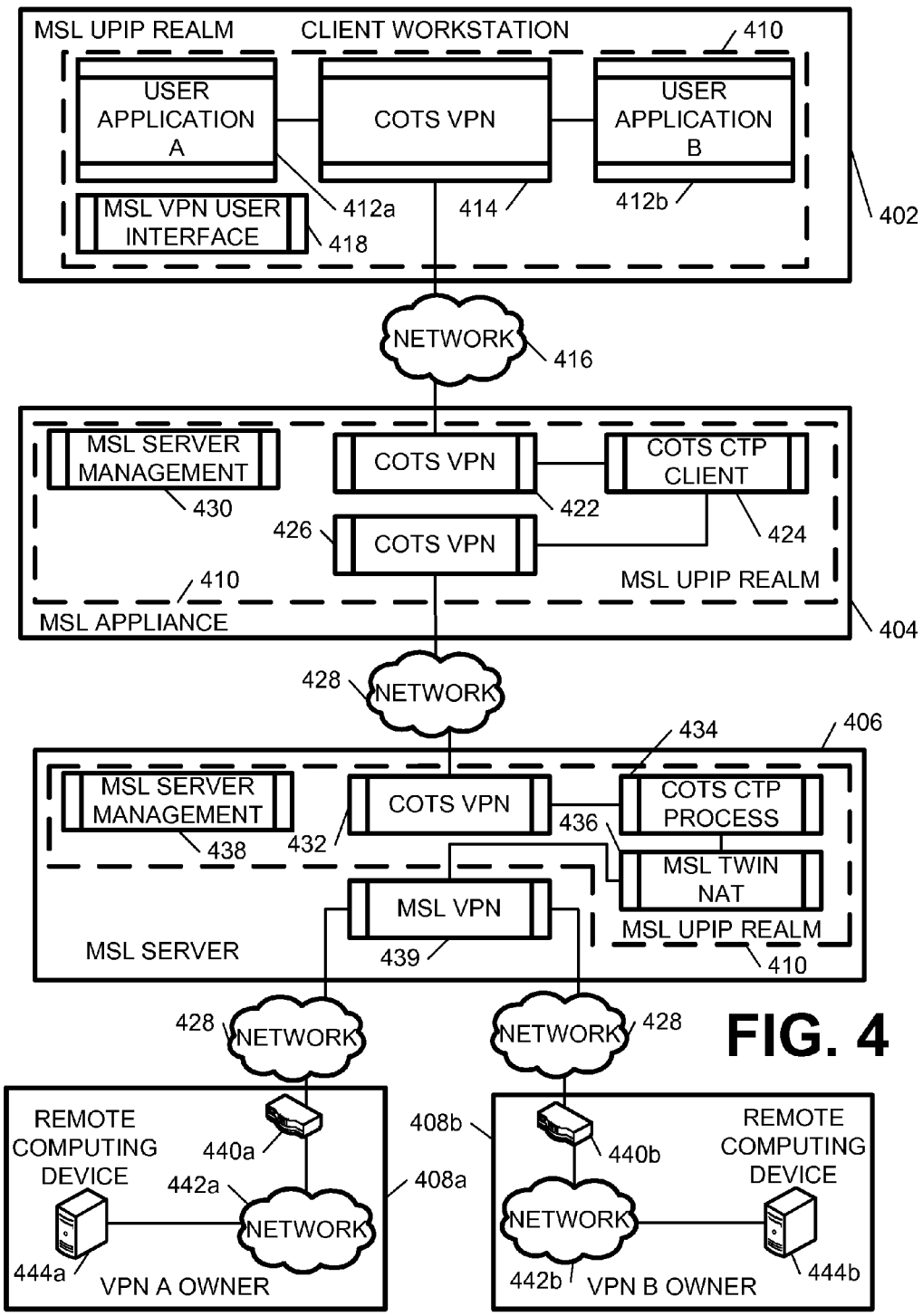
FIG. 4 depicts a computing environment for providing a multiple secure link architecture on a client workstation, according to embodiments disclosed herein.

FIG. 4 depicts a computing environment for providing a multiple secure link architecture on a client workstation 402, according to embodiments disclosed herein. As illustrated, the embodiment of FIG. 4 includes a client workstation 402, a MSL appliance 404, an MSL server 406, a VPN A 408a, and a VPN B 408b. The client workstation 402 may include a user application A 412a, a user application B 412b, a first COTS VPN component 414, as well as a MSL VPN user interface component 418, which comprise a portion of a MSL UPIP realm 410. Additionally, the client workstation 402 may be coupled to the MSL appliance 404 via an encrypted tunnel and/or in an encrypted form on a private network 416.

The MSL appliance 404 may include a second COTS VPN component 422, a first COTS clear text process client 424, a third COTS VPN component 426, and a first MSL server management component 430, which are also part of the MSL UPIP realm 410. The MSL appliance 404 may be coupled to a public network 428 for communicating with a VPN 408a, 408b via the MSL server 406.

Also coupled to the public network 428 is the MSL server 406. The MSL server 406 includes a fourth COTS VPN component 432, a COTS clear text process 434, and a second MSL server management component 438, which are also part of the MSL UPIP realm 410. A MSL VPN component 439 is also part of the MSL server 406 and is coupled to the public network 428.

Also coupled to the public network 428 are the VPN A 408a and the VPN B 408b. The VPN A 408a includes an owner gateway 440a, a private network 442a, and one or more computing devices, such as a remote computing device 444a. The VPN B 408b includes an owner gateway 440b, a private network 442b and one or more computing devices, such as a remote computing device 444b.

Accordingly, the embodiment of FIG. 4 provides an implementation that extends the MSL UPIP realm 410 to an MSL appliance 404 supporting a plurality of different client workstations (similar to FIG. 3), but also utilizes the MSL server 406. It should be understood that that in some embodiments, the MSL appliance 404 may be implemented within a gateway router supporting a small office. Additionally, the third COTS VPN component 426 and the fourth COTS VPN component 432 are coupled between the MSL server 406 and the MSL appliance 404 to protect data as it moves between the MSL Appliance 404 and the MSL server 406 over the public network 428. The first COTS VPN component 414 and the second COTS VPN component 422 are provided between the MSL appliance 404 and the client workstation 402 to protect data as it moves between the client workstation 402 and the MSL appliance 404 over the private network 416.

Figure 5:
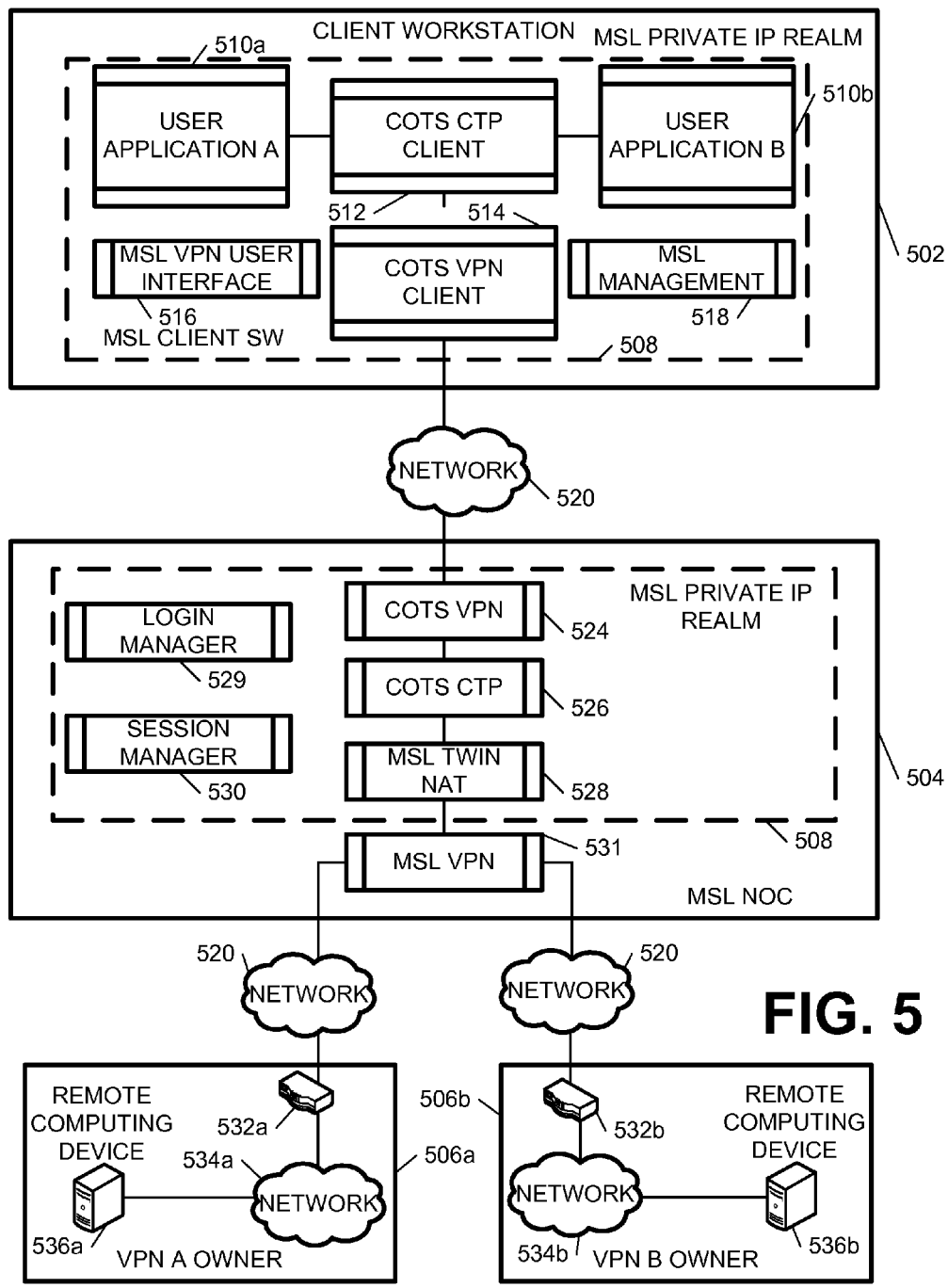
FIG. 5 depicts a computing environment for providing a multiple secure link architecture on a MSL network operations center (NOC), according to embodiments disclosed herein.

FIG. 5 depicts a computing environment for providing a multiple secure link architecture on a MSL network operations center (NOC) 504, according to embodiments disclosed herein. As illustrated, the embodiment of FIG. 5 includes a client workstation 502, a MSL network operations center (NOC) 504, a VPN A 506a, and a VPN B 506b. COTS components include: COTS VPN and COTS Clear Text Process.

The client workstation 502 includes a user application A 510a and a user application B 510b. Also included in the client workstation 502, as part of MSL client logic are a COTS clear text process client 512, a COTS VPN client 514, a MSL VPN user interface component 516, and a MSL management component 518. These components comprise part of a MSL private IP realm 508.

Coupling the client workstation 502 with the MSL NOC 504 is a public network 520. Accordingly, the MSL NOC 504 includes a COTS VPN component 524, a COTS clear text process component 526, a MSL twin NAT component 528, a login manager component 529, and a session manager component 530, which are also part of the MSL private IP realm 508. A MSL VPN component 531 is also part of the MSL NOC 504. The COTS clear text process component 526 may be implemented as a network acceleration product and may be implemented as an unmodified function operating on clear text packets to provide the service for the user customer.

Additionally, some embodiments include a client session manager on the client workstation 502 that communicates with the session manager component 530 and maintains session information for the client workstation 502. The VPN A 506a and the VPN B 506b include owner gateway 532a, 532b, a private network 534a, 534b, and a remote computing device 536a, 536b. The session manager component 530 may be configured to maintain session information for each client workstation that is logged into the service. The session manager component 530 may provide UPIP coordination information to the MSL Twin NAT component 528 and may update the client session manager with assigned UPIP for each owner gateway 532a, 532b. The session manager may also be configured to maintain the relationship between UPIP and public IP of the owner gateway 532a, 532b and/or VPN 506a, 506b. The login manager component 529 may be configured to process login requests from a client login manager (which may be part of the MSL management component 518) to validate client access to the service and to establish the VPN tunnel.

As described above, the MSL VPN component 531 may be utilized to provide the source IP on the external packets from the owner gateway 532a, 532b to identify the source gateway and/or VPN. By contrast, outbound datagrams from MSL Twin NAT component 528 include the destination public IP to identify the destination gateway and/or VPN. MSL VPN user interface component 516 manages the startup process for the client workstation 502. MSL VPN user interface component 516 communicates with login manager to validate the client license and establish the VPN to the MSL NOC 504. In addition, the MSL VPN user interface component 516 may be configured to use the session manager component 530 to start up and shutdown of each of the VPN connections requested by the client workstation 502.

Similarly, the MSL Twin NAT component 528 may be configured to translate both source and destination IP addresses in the clear text packets to and/or from assigned UPIP addresses. For inbound packets, the MSL twin NAT component 528 uses the source IP provided by the MSL VPN component 531 to identify the VPN owner. For outbound packets, the MSL twin NAT component 528 utilizes the source and destination UPIP to identify the destination public IP for the destination gateway and/or VPN. It should be understood that on the link between the MSL twin NAT component 528 and the MSL VPN component 531, packets may be wrapped in a private MSL architecture defined IP protocol that includes the public source and destination IP. It should also be understood that embodiments described herein may assign a UPIP that overlaps with a customer assigned private IP address. This does not create routing issues because the assigned address is unique within the MSL private IP realm 508 and mapped to the public IP of the owner gateway 532a, 532b by the session manager component 530. As will be understood, embodiments described herein may be configured such that no changes will be required in the VPN Owner's network.

It should be understood that while in some embodiments described above, a single workstation is depicted. While such embodiments may support one workstation, each of the embodiments described above may be configured for accommodating a plurality of workstations, depending on the particular configuration.

Figure 6:
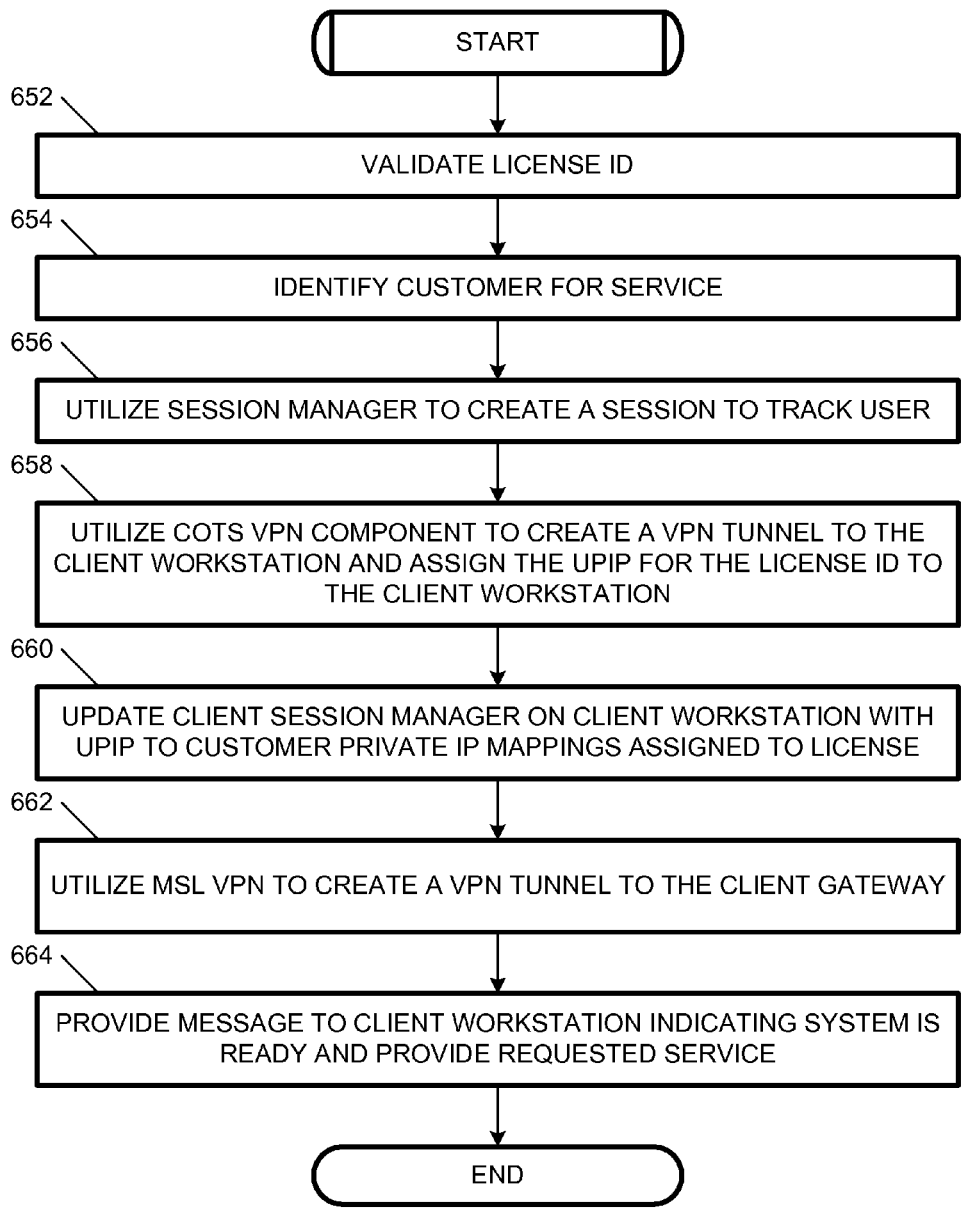
FIG. 6 depicts a flowchart for a login manager to provide a multiple secure link architecture, according to embodiments disclosed herein.

FIG. 6 depicts a flowchart for a login manager to provide a multiple secure link architecture, according to embodiments disclosed herein. As illustrated in block 652, the login manager may validate a license ID for accessing the system. In block 654, a customer may be identified for service. In block 656, a session manager may be utilized to create a session to track a user. In block 658, a COTS VPN component may be utilized to create a VPN tunnel to create a VPN tunnel to the client workstation and assign the UPIP for the license ID to the client workstation. In block 660, a client session manager on the client workstation may be updated with UPIP to customer private IP mappings assigned to license. In block 662, a MSL VPN may be utilized to create the VPN tunnel to the client gateway. In block 664, a message to the client workstation may be provided indicating that the system is ready and provide the requested service.

Figure 7:
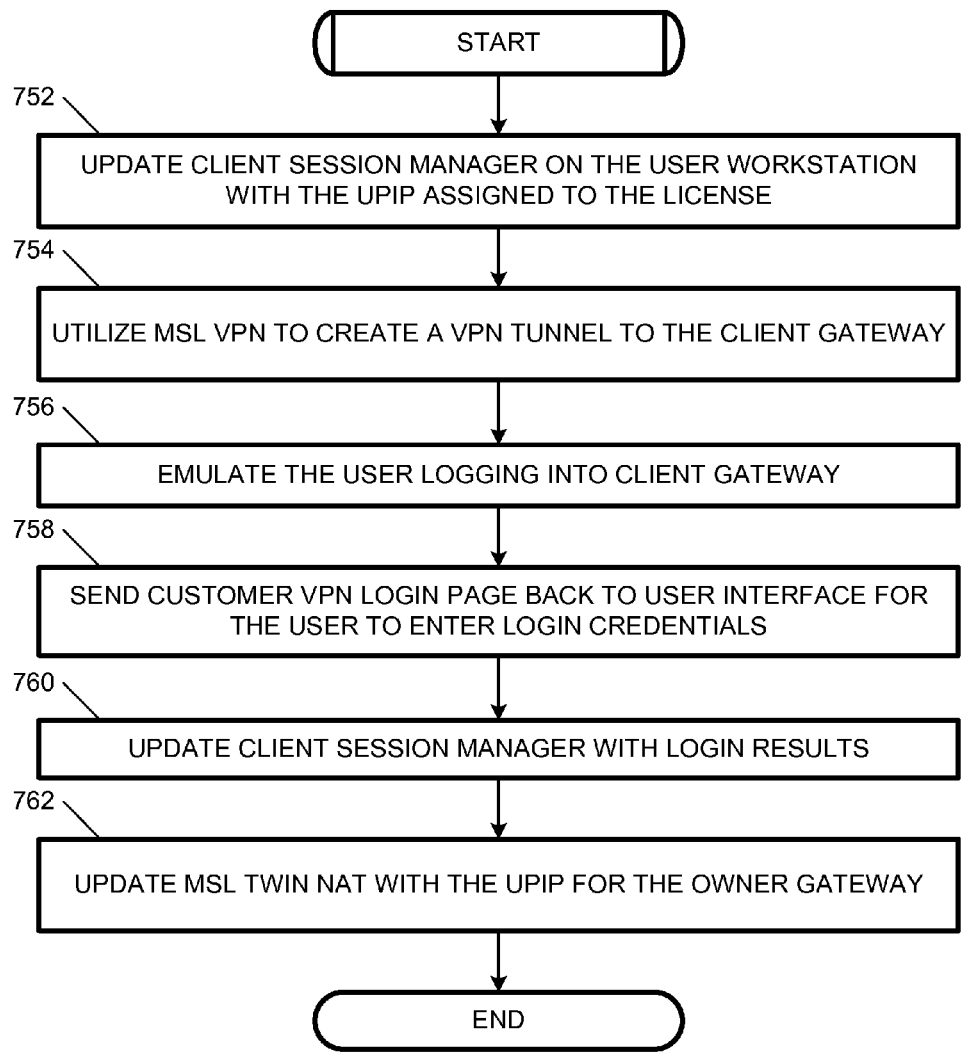
FIG. 7 depicts a flowchart for a session manager to provide a multiple secure link architecture, according to embodiments disclosed herein.

FIG. 7 depicts a flowchart for a session manager to provide a multiple secure link architecture, according to embodiments disclosed herein. As illustrated in block 752, a client session manager on the client workstation may be updated with the UPIP assigned to the license. In block 754, a MSL VPN component may be utilized to create the VPN tunnel to the client gateway. In block 756, an emulation may be performed of the user logging into the client gateway. In block 758 a customer VPN login page may be sent back to the user interface for the user to enter login credentials. In block 760, a client session manager may be updated with the login results. In block 762, a MSL twin NAT component may be updated with the UPIP for the owner gateway.

Figure 8A:
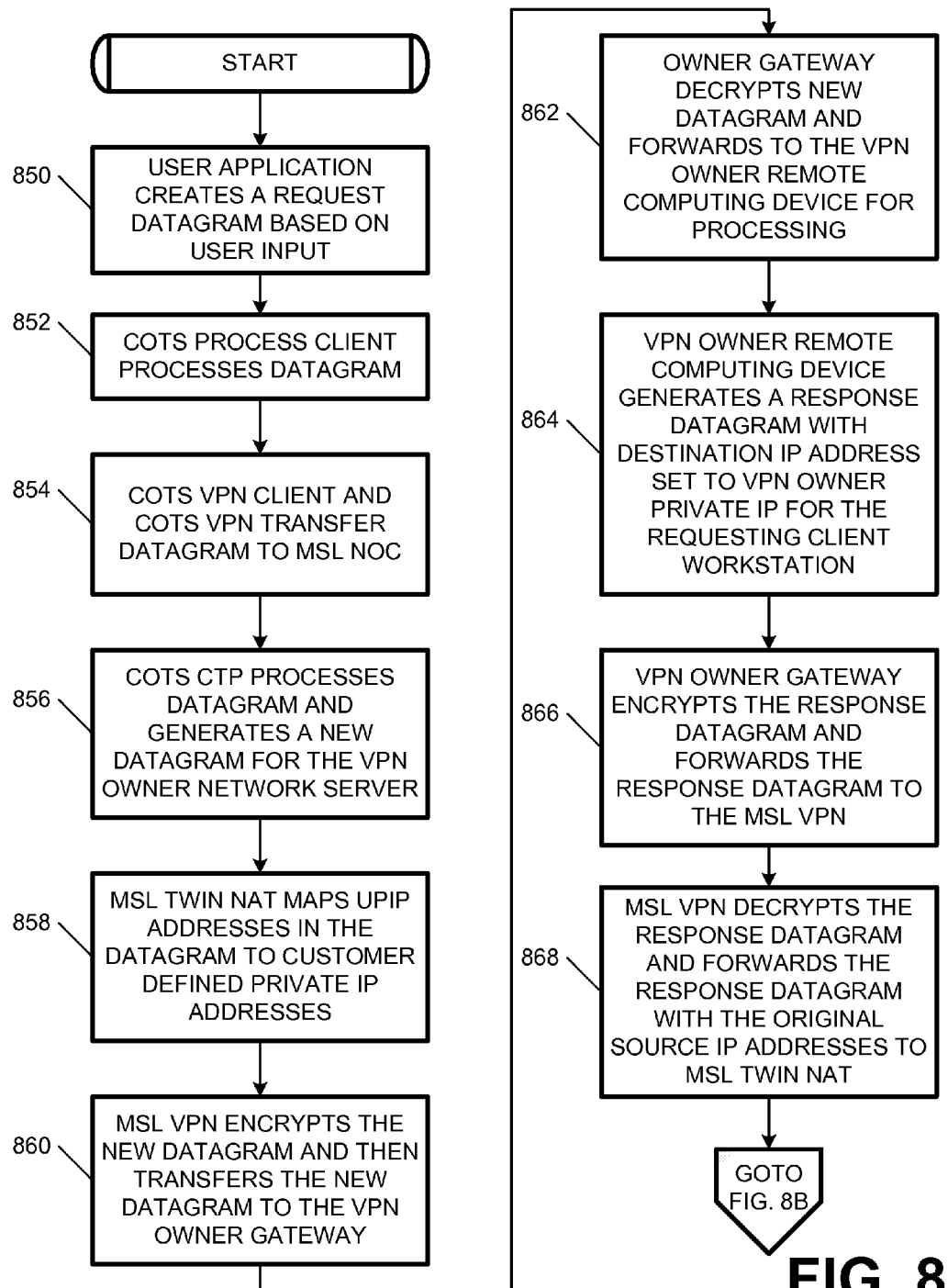
FIGS. 8A, 8B depict a flowchart for a plurality of components to provide a multiple secure link architecture, according to embodiments disclosed herein.
Figure 8B:
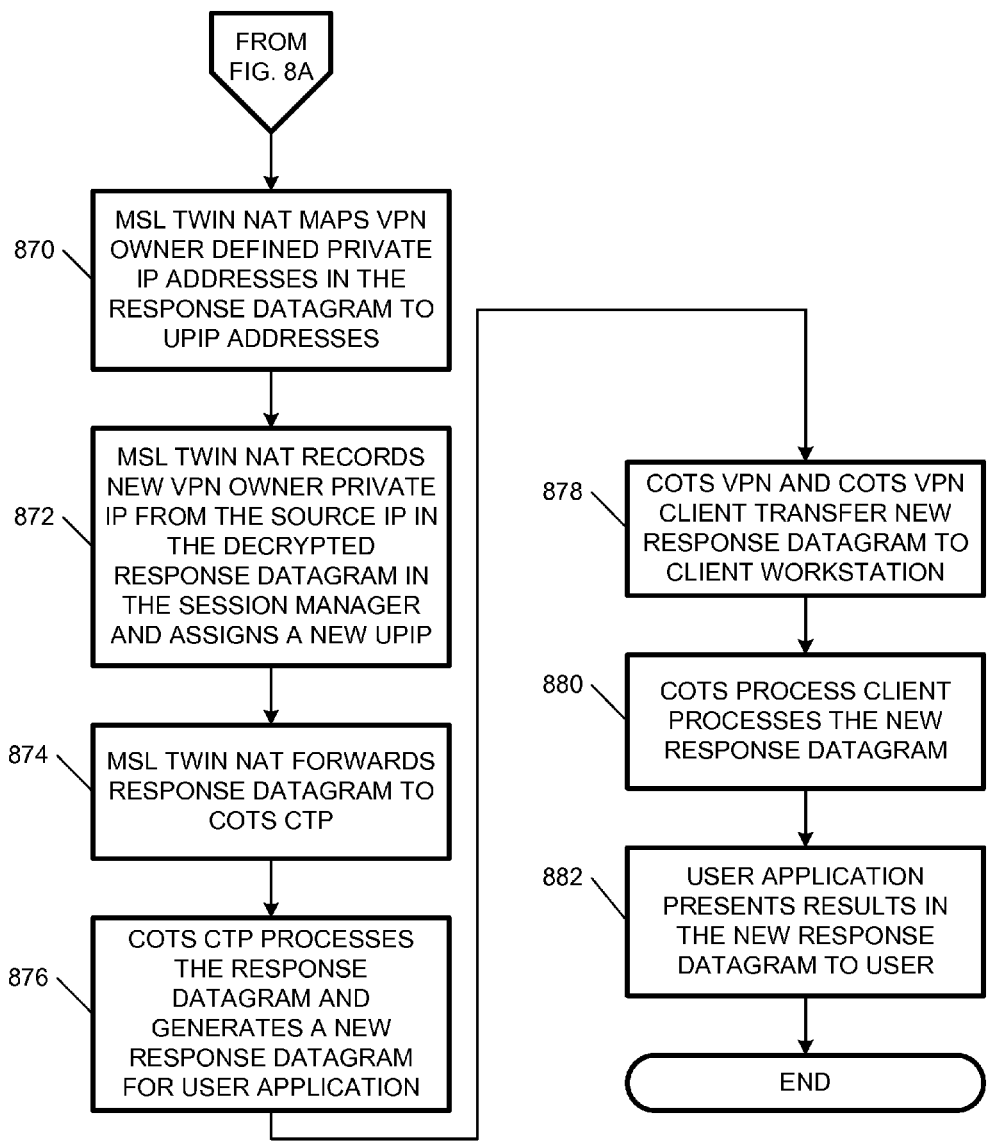

FIGS. 8A, 8B depict a flowchart for a plurality of components to provide a multiple secure link architecture, according to embodiments disclosed herein. As illustrated in block 850 of FIG. 8A, a user application may create a request datagram based on user input. In block 852, a COTS process client processes the datagram. In block 854, a COTS VPN client and a COTS VPN transfer the datagram to a MSL NOC. In block 856, a COTS clear text process processes the datagram and generates a new datagram for the VPN owner server. In block 858, a MSL twin NAT maps UPIP addresses in the datagram to customer-defined private IP addresses. In block 860, the MSL VPN may encrypt the new datagram and then transfers the new datagram to the owner gateway. In block 862, the owner gateway decrypts the new datagram and forwards the new datagram to the VPN owner remote computing device for processing. In block 864, the VPN owner remote computing device generates a response datagram with a destination IP address set to the VPN owner private IP for the requesting client workstation. In block 866, the VPN owner gateway encrypts the response datagram and forwards the response datagram to the MSL VPN component. In block 868, the MSL VPN decrypts the response datagram and forwards the response datagram with the original source IP addresses to the MSL twin NAT.

Continuing in block 870 of FIG. 8B, the MSL twin NAT maps VPN owner-defined private IP addresses in the response datagram to UPIP addresses. In block 872, the MSL twin NAT records the new VPN owner private IP from the source IP in the decrypted response datagram in the session manager and assigns a new UPIP. In block 874, the MSL twin NAT forwards the response datagram to the COTS clear text process component. In block 876, the COTS clear text process component processes the response datagram and generates a new response datagram for the user application. In block 878, the COTS VPN and the COTS VPN client transfer the new response datagram to the client workstation. In block 880, the COTS process client processes the new response datagram. In block 882, the user application presents results in the new response datagram to the user.

Figure 9:
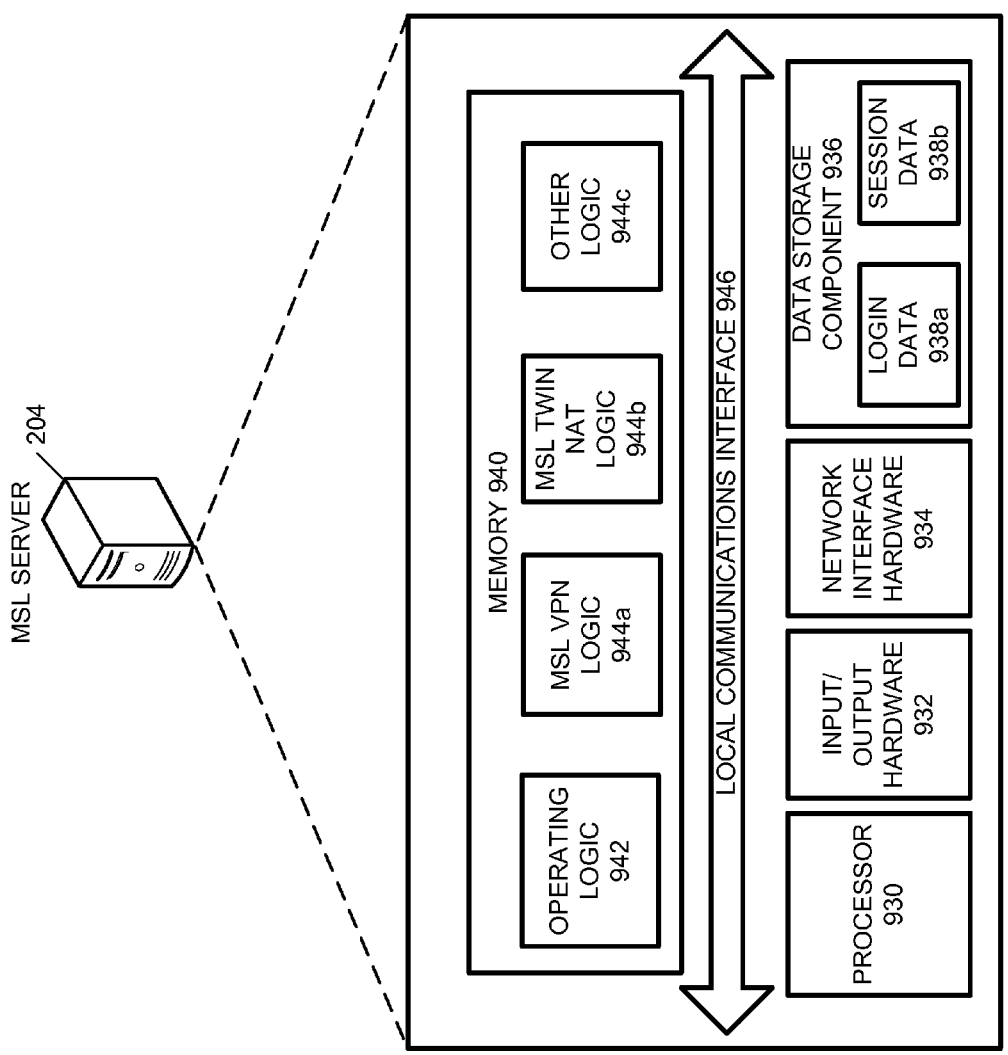
FIG. 9 depicts a computing device that may be utilized for providing a multiple secure link architecture, according to embodiments disclosed herein.

FIG. 9 depicts a computing device that may be utilized for providing a multiple secure link architecture, according to embodiments disclosed herein. In the illustrated embodiment, the MSL server 204 includes one or more processor 930, input/output hardware 932, network interface hardware 934, a data storage component 936 (which stores login data 938a and session data 938b), and the memory component 940. The memory component 940 may be configured as volatile and/or nonvolatile memory and, as such, may include random access memory (including SRAM, DRAM, and/or other types of RAM), flash memory, registers, compact discs (CD), digital versatile discs (DVD), and/or other types of non-transitory computer-readable mediums. Depending on the particular embodiment, the non-transitory computer-readable medium may reside within the MSL server 204 and/or external to the MSL server 204.

Additionally, the memory component 940 may be configured to store operating logic 942, the MSL VPN logic 944a, the MSL twin NAT logic 944b, and other logic, such as described above, each of which may be embodied as a computer program, firmware, and/or hardware, as an example. A local communications interface 946 is also included in FIG. 9 and may be implemented as a bus or other interface to facilitate communication among the components of the MSL server 204.

The processor 930 may include any processing component operable to receive and execute instructions (such as from the data storage component 936 and/or memory component 940). The input/output hardware 932 may include and/or be configured to interface with a monitor, keyboard, mouse, printer, camera, microphone, speaker, and/or other device for receiving, sending, and/or presenting data. The network interface hardware 934 may include and/or be configured for communicating with any wired or wireless networking hardware, a satellite, an antenna, a modem, LAN port, wireless fidelity (Wi-Fi) card, WiMax card, mobile communications hardware, fiber, and/or other hardware for communicating with other networks and/or devices. From this connection, communication may be facilitated between the MSL server 204 and other computing devices, as described above.

Similarly, it should be understood that the data storage component 936 may reside local to and/or remote from the MSL server 204 and may be configured to store one or more pieces of data for access by the MSL server 204 and/or other components. In some embodiments, the data storage component 936 may be located remotely from the MSL server 204 and thus accessible via a network connection. In some embodiments however, the data storage component 936 may merely be a peripheral device, but external to the MSL server 204.

Included in the memory component 940 are the operating logic 942, the MSL VPN logic 944a, and the MSL twin NAT logic 944b, and the other logic 944c. The operating logic 942 may include an operating system and/or other software for managing components of the MSL server 204. Similarly, the MSL VPN logic 944a may include logic for performing the MSL VPN functionality described above. The MSL twin NAT logic 944b may include logic for performing the MSL twin NAT functionality described above. The other logic 944c is included herein to represent the other logic and functionality described above.

It should be understood that the components illustrated in FIG. 9 are merely exemplary and are not intended to limit the scope of this disclosure. While the components in FIG. 9 are illustrated as residing within the MSL server 204, this is merely an example. In some embodiments, one or more of the components may reside external to the MSL server 204. It should also be understood while the MSL server 204 is depicted in FIG. 9, other computing devices described in FIGS. 1-6 or other drawings may include similar hardware and software for providing the described functionality. As an example, client workstations 102, 202, 302, 402, and/or 502 may include some or all of the hardware and software components described above. Accordingly, to the extent applicable, the components described in FIGS. 1-6 may be embodied as logic and/or software that are executed within a computing device that includes the requisite hardware, some of which is represented in FIG. 9.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all permutations and sub-permutations of all elements, features, and aspects discussed above. All such modifications and variations are intended to be included herein within the scope of this disclosure.

Therefore, at least the following is claimed:

1. A system for providing a multiple secure link (MSL) architecture, comprising:
 a MSL virtual private network (VPN) component that includes first logic that, when executed by a processor, causes the system to perform the following:
  create a first VPN tunnel between a client workstation and a first owner gateway;
  send an outbound datagram from the client workstation to the first owner gateway;
  receive an inbound datagram from the first owner gateway to the client workstation, wherein the inbound datagram includes a source internet protocol (IP) address and a destination IP address that is set to a VPN owner private IP address; and
  send the inbound datagram with the destination IP address; and
 a MSL twin network address translator (NAT) that includes second logic that, when executed by the processor, causes the system to perform at least the following:
  receive the inbound datagram from MSL VPN;
  record a new VPN owner private IP address from the source IP address in the inbound datagram;
  assign a new unique private IP (UPIP) address for the inbound datagram and the client workstation; and
  send the inbound datagram to the client workstation,
 wherein the system additionally creates a second VPN tunnel between the client workstation and a second owner gateway while the first VPN tunnel is being utilized.

2. The system of claim 1, wherein the first logic further causes the system to perform the following:
 encrypt the outbound datagram and transfer the outbound datagram to the first owner gateway; and
 receive the inbound datagram in an encrypted form from the first owner gateway and decrypt the inbound datagram.

3. The system of claim 1, wherein the second logic further causes the system to map a UPIP address in the outbound datagram to a private IP address.

4. The system of claim 1, further comprising a MSL VPN user interface component that includes third logic that, when executed by the processor, causes the system to provide a user interface for establishing the first VPN tunnel to the client workstation.

5. The system of claim 1, further comprising a MSL management component that includes fourth logic that, when executed by the processor, causes the system to create the first VPN tunnel.

6. The system of claim 1, wherein the second logic further causes the system to forward the inbound datagram to a commercial off the shelf (COTS) clear text process component for processing the inbound datagram.

7. The system of claim 1, wherein the MSL twin NAT and the MSL VPN reside on the client workstation and wherein the client workstation further includes a MSL VPN user interface component and a MSL management component.

8. The system of claim 1, further comprising an MSL server, wherein the MSL VPN and the MSL twin NAT reside on the MSL server that is remote from the client workstation, wherein the system further comprises includes an MSL VPN user interface component, a first MSL VPN component, and a first MSL management component that reside on the client workstation, and wherein the system further comprises a commercial off the shelf (COTS) clear text process component, a COTS VPN component, and a second MSL management component that reside on the MSL server.

9. The system of claim 1, further comprising an MSL gateway router that includes the MSL VPN and the MSL twin NAT, wherein the system further comprises a first COTS VPN component, a MSL management component that reside on the client workstation, and wherein the system further comprises a second COTS VPN component and an MSL server management component that reside on the MSL gateway router.

10. The system of claim 1, further comprising a MSL appliance and a MSL server, wherein the MSL VPN component and the MSL twin NAT reside on the MSL server, wherein the system further comprises a first COTS VPN component and a MSL VPN user interface component that reside on the client workstation, wherein the system further comprises a first MSL server management component, a second COTS VPN component, a third COTS VPN component, and a COTS clear text process client component that reside on the MSL appliance, and wherein the system further comprises a second MSL server management component, a fourth COTS VPN component, and a second COTS clear text process client that reside on the MSL server.

11. The system of claim 1, further comprising a MSL network operations center (NOC), wherein the MSL twin NAT and the MSL VPN component reside on the NOC, wherein the system further comprises a COTS VPN client, a MSL VPN user interface component, and a MSL management component that reside on the client workstation, and wherein the system further comprises a COTS VPN component, a COTS clear text process component, a session manager component, and a login manager component that reside on the MSL NOC.

12. A method for providing a multiple secure link (MSL) architecture, comprising:
   creating a first VPN tunnel between a client workstation and a first owner gateway;
   sending an outbound datagram from the client workstation to the first owner gateway;
   receiving an inbound datagram from the first owner gateway to the client workstation, wherein the inbound datagram includes a source internet protocol (IP) address and a destination IP address that is set to a VPN owner private IP address;
   recording a new VPN owner private IP address from the source IP address in the inbound datagram;
   assigning a new unique private IP (UPIP) address for the inbound datagram and the client workstation; and
   sending the inbound datagram to the client workstation,
   wherein the system additionally creates a second VPN tunnel between the client workstation and a second owner gateway while the first VPN tunnel is being utilized.

13. The method of claim 12, further comprising:
   encrypting the outbound datagram and transfer the outbound datagram to the first owner gateway; and
   receiving the inbound datagram in an encrypted form from the first owner gateway and decrypt the inbound datagram.

14. The method of claim 12, further comprising mapping a UPIP address in the outbound datagram to a private IP address.

15. The method of claim 12, further comprising providing a user interface for establishing the VPN tunnel to the client workstation.

16. The method of claim 12, further comprising creating the first VPN tunnel.

17. The method of claim 12, further comprising forwarding the inbound datagram to a commercial off the shelf (COTS) clear text process component for processing the inbound datagram.

18. A non-transitory computer-readable medium for providing a multiple secure link (MSL) architecture that includes logic that, when executed by a computing device, causes the computing device to perform at least the following:
   create a first VPN tunnel between a client workstation and a first owner gateway;
   send an outbound datagram from the client workstation to the first owner gateway;
   receive an inbound datagram from the first owner gateway to the client workstation, wherein the inbound datagram includes a source internet protocol (IP) address and a destination IP address that is set to a VPN owner private IP address;
   record a new VPN owner private IP address from the source IP address in the inbound datagram;
   assign a new unique private IP (UPIP) address for the inbound datagram and the client workstation; and
   send the inbound datagram to the client workstation,
   wherein the system additionally creates a second VPN tunnel between the client workstation and a second owner gateway while the first VPN tunnel is being utilized.

19. The non-transitory computer-readable medium of claim 18, wherein the logic further causes the computing device to preform at least the following:
   encrypt the outbound datagram and transfer the outbound datagram to the first owner gateway; and
   receive the inbound datagram in an encrypted form from the first owner gateway and decrypt the inbound datagram.

* * * * *